United States Patent [19]
Kuwahara

[11] Patent Number: 5,435,649
[45] Date of Patent: Jul. 25, 1995

[54] LINEAR MOTION GUIDE UNIT

[75] Inventor: Hideki Kuwahara, Gifu, Japan

[73] Assignee: Nippon Thompson Co., Ltd., Tokyo, Japan

[21] Appl. No.: 185,393

[22] Filed: Jan. 24, 1994

[30] Foreign Application Priority Data

Jan. 25, 1993 [JP]  Japan .............................. 5-005151 U
Jan. 25, 1993 [JP]  Japan .............................. 5-005152 U

[51] Int. Cl.⁶ .................................................. F16C 29/06
[52] U.S. Cl. ........................................ 384/13; 384/15; 384/45
[58] Field of Search ................... 384/13, 15, 45, 44, 384/43

[56] References Cited

U.S. PATENT DOCUMENTS 5,374,127 12/1994  Agari ..................................... 384/15
5,380,096  1/1995  Tanaka ................................. 384/13
5,380,097  1/1995  Tanaka ................................. 384/13
5,388,911  2/1995  Agari ..................................... 384/15

Primary Examiner—Lenard A. Footland
Attorney, Agent, or Firm—Sughrue, Mion, Zinn, Macpeak & Seas; Richard C. Turner

[57] ABSTRACT

A linear motion guide unit is described that allows seal attachment to be performed highly accurately and easily as well as preventing dislocation of the seals after attachment. Said effects are obtained by providing projections and slots in a slider and seals and mutually engaging these projections and slots. In addition, a linear motion guide unit is described that allows lubricant to be supplied both quickly and easily without having to disassemble the linear motion guide unit even when small in size. Said effect is obtained by forming lubricant injection holes in the seals and injecting a lubricant such as grease through said lubricant injection holes with a lubricant injector.

10 Claims, 22 Drawing Sheets

LINEAR MOTION GUIDE UNIT

BACKGROUND OF THE INVENTION

1. Field of the Invention

The present invention relates to a linear motion guide unit that linearly guides an object to be moved, and which is equipped on, for example, a machine tool or industrial robot.

2. Description of the Prior Art

An example of this type of linear motion guide unit of the prior art is the linear motion rolling guide unit shown in FIGS. 1 and 2.

As shown in the drawings, said linear motion rolling guide unit has track rail 201, in which tracks in the form of a pair of track grooves 201a are formed in both the right and left sides along the lengthwise direction, a slider in the form of sliding unit 203 having rolling element circulating path 202 (refer to FIG. 2) and able to move relative to said track rail 201, and a plurality of rolling elements in the form of balls 204, that bear the load between track rail 201 and sliding unit 203 by circulating while rolling over the above-mentioned track grooves 201a accompanying movement of sliding unit 203, and which are arranged and contained within said rolling element circulating path 202.

Sliding unit 203 has casing 206, provided so as to straddle track rail 201, and a pair of end caps 207a and 207b coupled to both the front and back ends of said casing 206. Two seals 208a and 208b are attached with screws 210 to the outer surfaces of each of said end caps 207a and 207b.

In the above-mentioned linear motion guide unit, seals 208a and 208b have the action of wiping off any dust and so forth on track rail 201 at the time of movement of sliding unit 203. Accordingly, sliding unit 203 moves smoothly and damage to balls 204, rolling element circulating path 202 and track grooves 201a caused by entrance of dust is prevented.

However, if the mounting positions of the above-mentioned seals 208a and 208b are incorrect, together with cleaning and sealing effects becoming inadequate, the contact of the lip portions of said seals 208a and 208b with track rail 201 is not uniform, thus inhibiting smooth operation of sliding unit 203. Consequently, considerable effort is required to increase accuracy when attaching seals 208a and 208b, thus being a problem that ought to be solved in terms of improving manufacturing efficiency. In addition, the above-mentioned linear motion guide unit also has the disadvantage of seals 208a and 208b attached with screws 210 being easily shifted out of position as a result of being subjected to impact.

On the other hand, in the above-mentioned linear motion rolling guide unit, lubricant usually in the form of grease is filled between balls 204 and other members demonstrating relative motion for the purpose of obtaining smooth movement and preventing wear of sliding unit 203 as well as suppressing the production of noise accompanying said movement.

Although an adequate amount of this grease is filled during assembly of the linear motion guide unit, it becomes necessary to replenish this grease since it is gradually consumed as the amount of time said linear motion guide unit is used increases. A common means employed to supply this grease involves the attachment of a grease nipple to the sliding unit and injecting grease into said grease nipple with a grease gun.

However, in the case of small linear motion guide units, and specifically with respect to those wherein dimension H is 20 mm or less as shown in FIG. 2, it is difficult to attach a grease nipple due to the limitations on this dimension. Accordingly, with respect to this type of small linear motion guide unit, operation of the machine tool and so forth on which it is equipped must temporarily be stopped, the linear motion guide unit must be removed, and the sliding unit must be disassembled followed by filling with grease. Thus, this results in the disadvantage of causing a delay in work.

SUMMARY OF THE INVENTION

In consideration of the above-mentioned disadvantages of the prior art, a first object of the present invention is to provide a linear motion guide unit that allows mounting of seals to be performed both accurately and easily, while also preventing dislocation of the seals after mounting.

In addition, a second object of the present invention is to provide a linear motion guide unit that, despite being small, allows supply of lubricant to be performed both rapidly and easily.

In order to achieve the above-mentioned first object of the present invention, the present invention comprises a linear motion guide unit equipped with a track rail in which tracks are formed in the lengthwise direction, a slider able to move relative to said track rail, and seals provided on both ends of said slider; wherein, projections that stipulate the mounting position of said seals are formed on either said slider or said seals, and slots that engage with said projections; are formed in either said slider or said seals on which said projections are not formed.

In addition, in order to achieve the above-mentioned second object of the present invention, the present invention comprises a linear motion guide unit equipped with a track rail in which tracks are formed in the lengthwise direction, a slider able to move relative to said track rail, and seals provided on both ends of said slider; wherein, lubricant injection holes are formed in said seals.

DESCRIPTION OF THE PREFERRED EMBODIMENTS

The following provides an explanation of the embodiments of the present invention with reference to the attached drawings.

FIGS. 3 through 14 show a first embodiment of the linear motion rolling guide unit of the present invention. Furthermore, this linear motion rolling guide unit is of the rail type.

Figure 1:
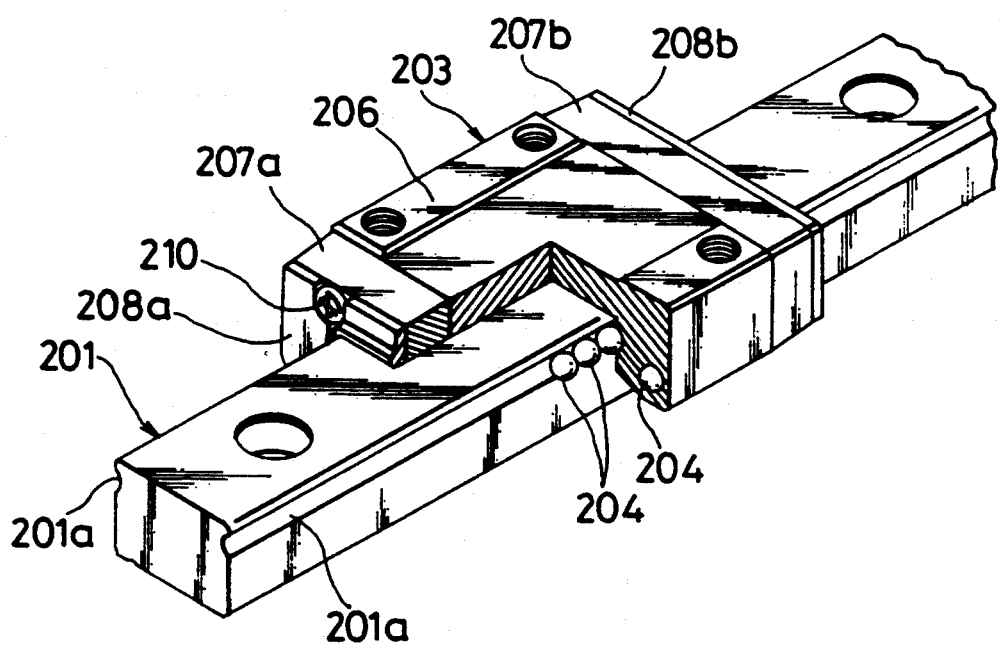
FIG. 1 is a perspective view, including a partial cross-section, of the essential portion of the linear motion rolling guide unit of the prior art.
Figure 2:
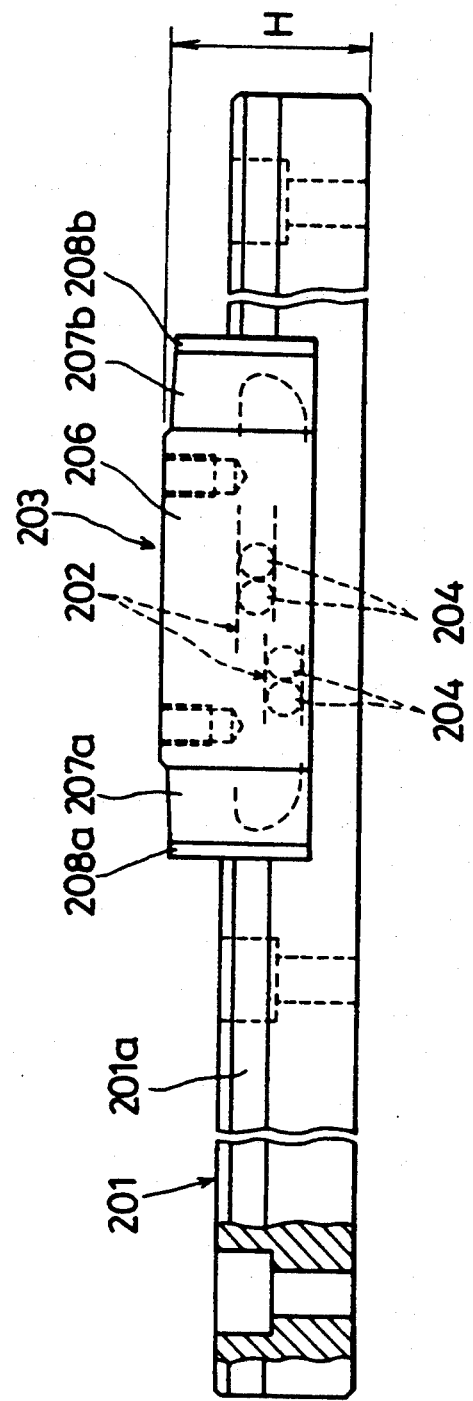
FIG. 2 is a side view, including a partial cross-section, of the linear motion rolling guide unit shown in FIG. 1.
Figure 3:
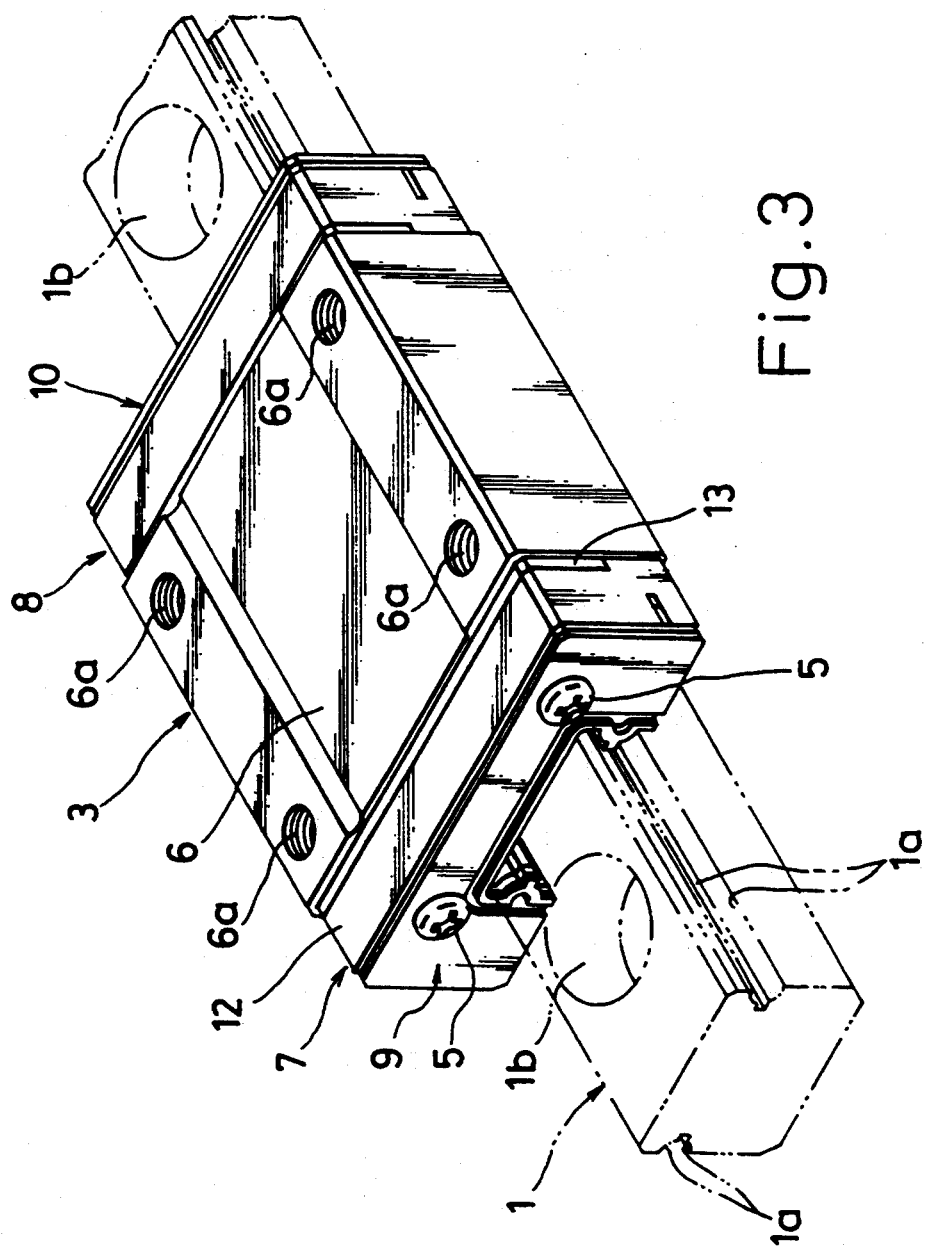
FIG. 3 is a perspective view of the essential portion of a first embodiment of the linear motion rolling guide unit of the present invention.
Figure 4:
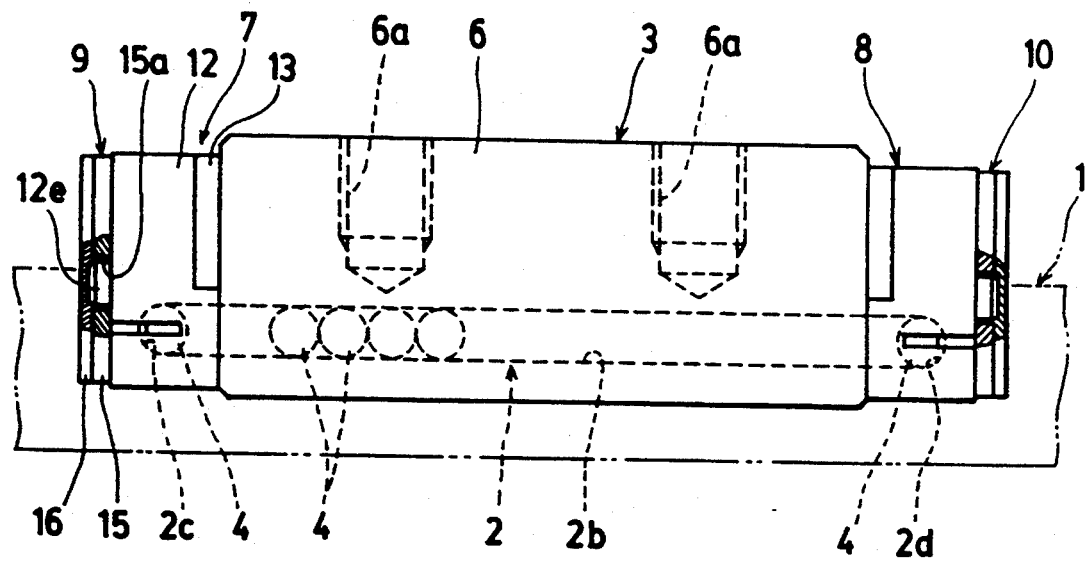
FIG. 4 is a side view, including a partial cross-section, of the constitution shown in FIG. 3.
Figure 5:
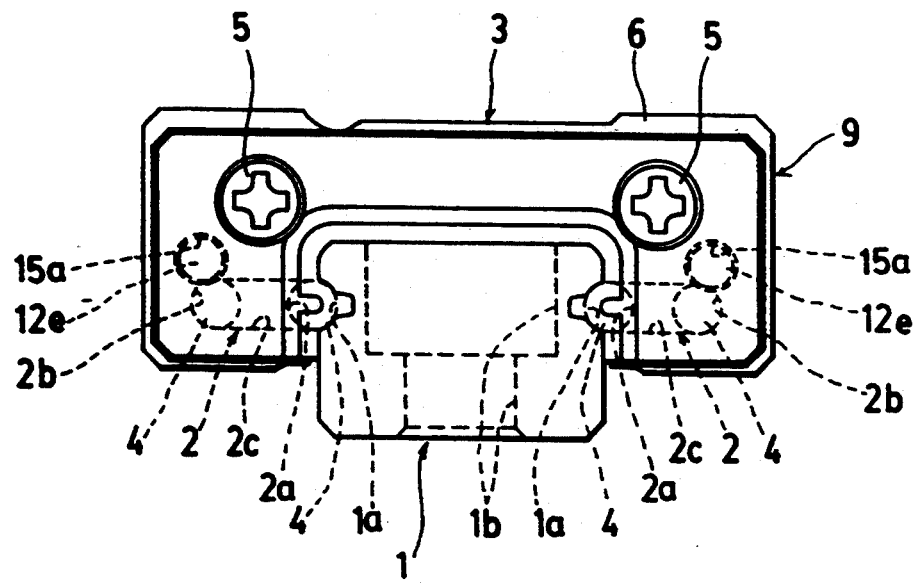
FIG. 5 is a front view of the constitution shown in FIG. 3.

As shown in FIGS. 3 through 5, said linear motion rolling guide unit has track rail 1, roughly in the shape of a square column made of metal, in which one each of tracks in the form of metal track grooves 1a are formed on the right and left sides in the lengthwise direction, a slider in the form of sliding unit 3 having rolling element circulating path 2 (refer to FIGS. 4 and 5, the details of which are described hereinafter) and able to move relative to this track rail 1, and a plurality of rolling elements in the form of balls 4 arranged and contained in said rolling element circulating path 2, which bear the load between track rail 1 and sliding unit 3 by circulating while rolling over the above-mentioned track grooves 1a accompanying movement of this sliding unit 3.

Figure 6:
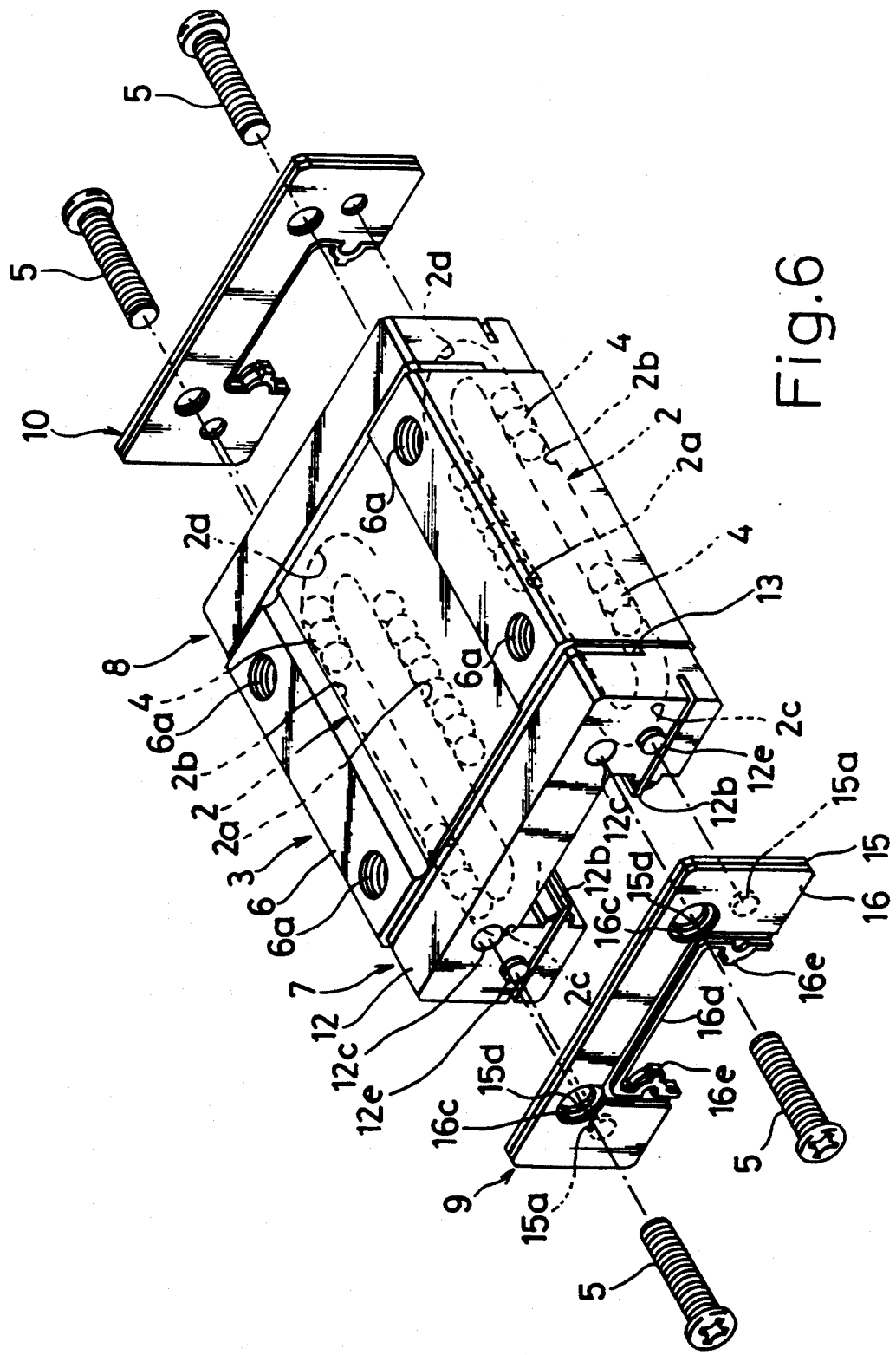
FIG. 6 is an exploded perspective view of the constitution shown in FIG. 3.

As shown in FIG. 6, sliding unit 3 is composed of casing 6 formed from metal or plastic which is provided so as to straddle track rail 1, and a pair of end caps 7 and 8 made of metal or plastic which are fastened to both the front and back ends of said casing 6 with screws 5. Seals 9 and 10 are attached to each of the outer surfaces of said end caps 7 and 8. Furthermore, seals 9 and 10 are fastened to casing 6 together with end caps 7 and 8 by screws 5. As shown in FIGS. 4 through 6, the above-mentioned rolling element circulating path 2 is composed of a load bearing track in the form of load bearing track groove 2a and return path 2b formed linearly and mutually in parallel in casing 6, and a pair of roughly semi-circular direction changing paths 2c and 2d which are formed in both end caps 7 and 8 and connect said load bearing track groove 2a and return path 2b at both of their ends. Furthermore, said load bearing track groove 2a corresponds to track groove 1a of track rail 1.

Said linear motion rolling guide unit is arranged on, for example, the bed of a machine tool (not shown), and track rail 1 is mounted on said bed with bolts. A table for holding a workpiece and so on (not shown) is bolted to sliding unit 3, with said table operating as the moving side. Namely, said table is reciprocated by a driving device with a workpiece placed on said table. Furthermore, as shown in FIGS. 3 and 5, a plurality of insertion holes 1b, into which bolts are inserted for mounting to the above-mentioned bed and so on, are provided in a row along the lengthwise direction of track rail 1. In addition, as shown in FIGS. 3 and 4, a plurality of threaded holes 6a are formed in the upper surface of casing 6 of sliding unit 3. The above-mentioned table is fastened to sliding unit 3 by bolts that are screwed into these threaded holes 6a.

The following provides a detailed description of the constitutions of the above-mentioned end caps 7 and 8 as well as both seals 9 and 10. Furthermore, since each of end caps 7 and 8 as well as each of seals 9 and 10 are mutually formed to have the same shape, explanations will be provided only for one end cap 7 and one seal 9, while explanations of the other end cap 8 and other seal 10 will be omitted.

An explanation is first provided regarding end cap 7. As is clear from FIGS. 3, 4 and 6, this end cap 7 is composed of main portion 12 and circulating path spacer 13 juxtapositioned between said main portion 12 and casing 6.

Figure 7:
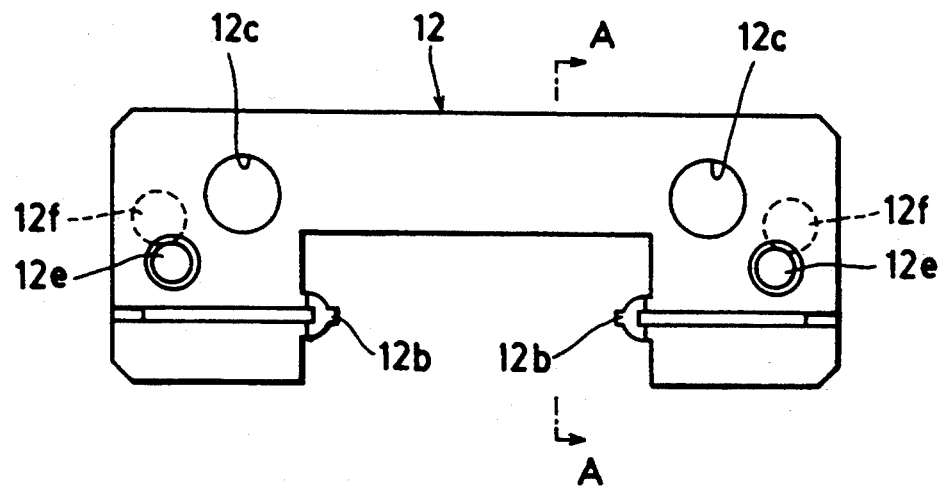
FIG. 7 is a front view of the main portion of the end cap equipped on the linear motion rolling guide unit shown in FIG. 3.
Figure 8:
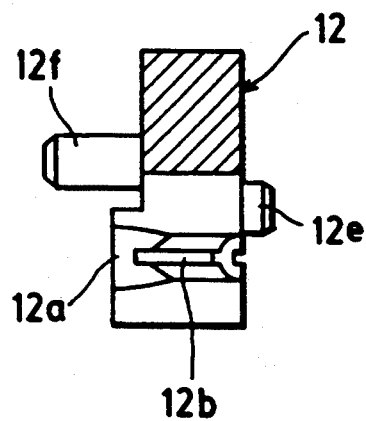
FIG. 8 is a cross-sectional view taken along line A—A relating to FIG. 7.
Figure 9:
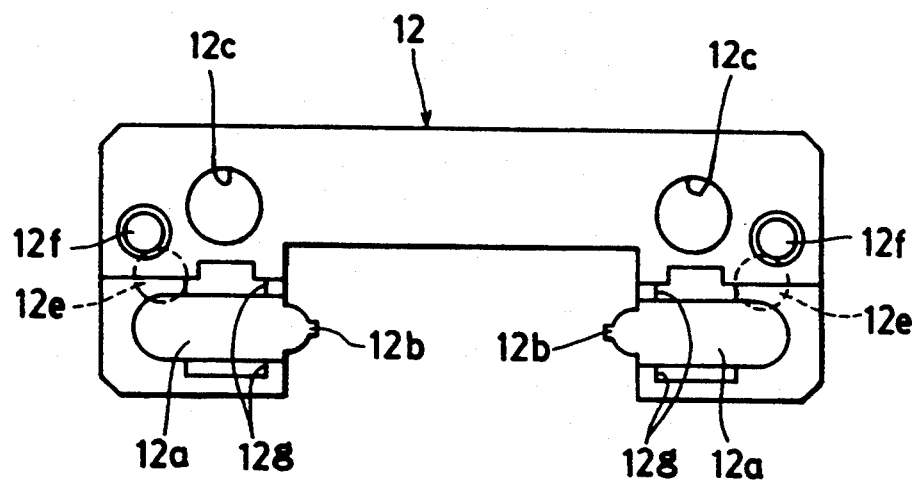
FIG. 9 is a rear view of the main portion of the end cap shown in FIG. 7.
Figure 10:
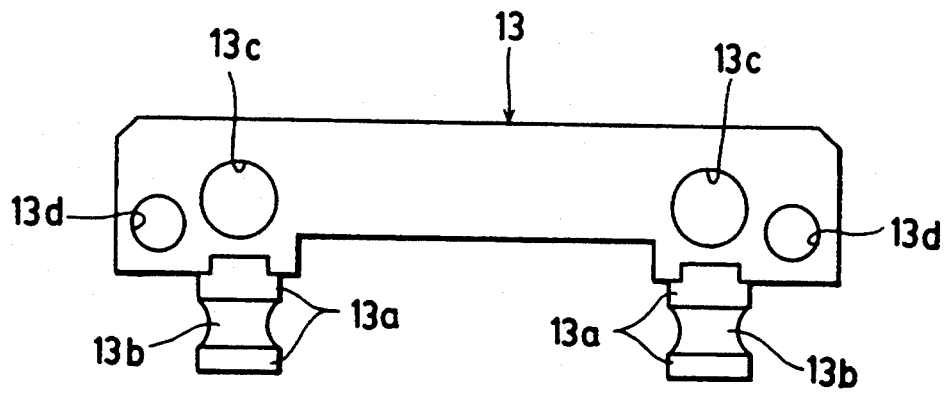
FIG. 10 is a front view of the circulating path spacer which is a constituent member of the end cap equipped on the linear motion rolling guide unit shown in FIG. 3.
Figure 11:
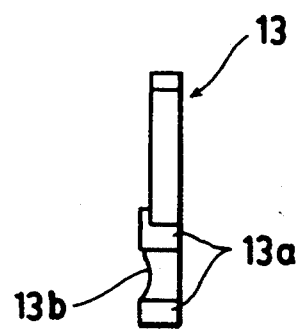
FIG. 11 is a side view of the circulating path spacer shown in FIG. 10.

The details of said main portion 12 are shown in FIGS. 7 through 9, while the details of said circulating path spacer 13 are shown in FIGS. 10 and 11.

As shown in FIGS. 8 and 9, roughly U-shaped groove 12a, which forms the outer half of direction changing path 2c (refer to FIGS. 4 through 6), a portion of rolling element circulating path 2, is formed in said main portion 12. On the other hand, as shown in FIGS. 10 and 11, roughly semi-cylindrical projections 13a are provided at two locations on circulating path spacer 13, while grooves 13b are formed in both said projections 13a forming the inner half of the above-mentioned direction changing path 2c. Namely, said projections 13a fit into slots 12g (shown in FIG. 9) formed in the above-mentioned main portion 12. This means that direction changing path 2c is formed by aligning both said groove 12a and projections 13b. In addition, as shown in FIGS. 6 through 9, ball retaining band 12b is formed in main portion 12 for retaining balls 4 that have rolled along load bearing track groove 2a (refer to FIGS. 5 and 6) to lead said balls 4 into the above-mentioned direction changing path 2c.

As shown in FIG. 6, insertion holes 12c, in which screws 5 (shown in FIG. 6, etc.) are inserted, are formed in the right and left sides of main portion 12. Furthermore, screws 5 are screwed into threaded holes (not shown) formed in the ends of casing 6 through these insertion holes 12c.

As shown in FIGS. 4 through 6, two, for example, cylindrical projections 12e are formed integrated into a single unit with main portion 12 and at symmetrical locations on the front surface of said main portion 12 close to the above-mentioned insertion holes 12c. These projections 12e are for fixing the mounting position of seal 9.

In addition, a pair of cylindrical projections 12f are formed integrated into a single unit with main portion 12 on the back surface of said main portion 12. The mounting position of end cap 7 with respect to casing 6 is determined as a result of these projections 12f fitting into fitting holes (not shown) formed in casing 6. In addition, as shown in FIG. 10, insertion holes 13c and 13d, into which the above-mentioned screws 5 and projections 12f of main portion 12 are inserted, are formed in circulating path spacer 13.

The following provides a detailed description of seal 9.

As shown in FIGS. 4, 6 and 12 through 14, seal 9 is composed of highly rigid plate-shaped core member 15 made of metal or plastic, and elastic member 16 made of rubber and so forth that is affixed with adhesive and so forth to the surface of said core member 15 and makes sliding contact with track rail 1.

As shown in the drawings, circular slot 15a is formed in core member 15 on the back side. However, as is clear from FIG. 14, this slot 15a is such that opening 15b is formed in core member 15 to have a diameter slightly larger than projection 12e formed in main portion 12 of end cap 7, and thin film 16a formed integrated into a single unit with elastic member 16 is attached along the inner surface of this opening 15b.

This slot 15a is engaged with the above-mentioned projection 12e. As a result of the engaging of these two, together with the attachment of seal 9 (10) to sliding unit 3 composed of casing 6 as well as end caps 7 and 8 being highly accurate and easy, said seal is not shifted out of position even when subjected to impact force after attachment.

Figure 12:
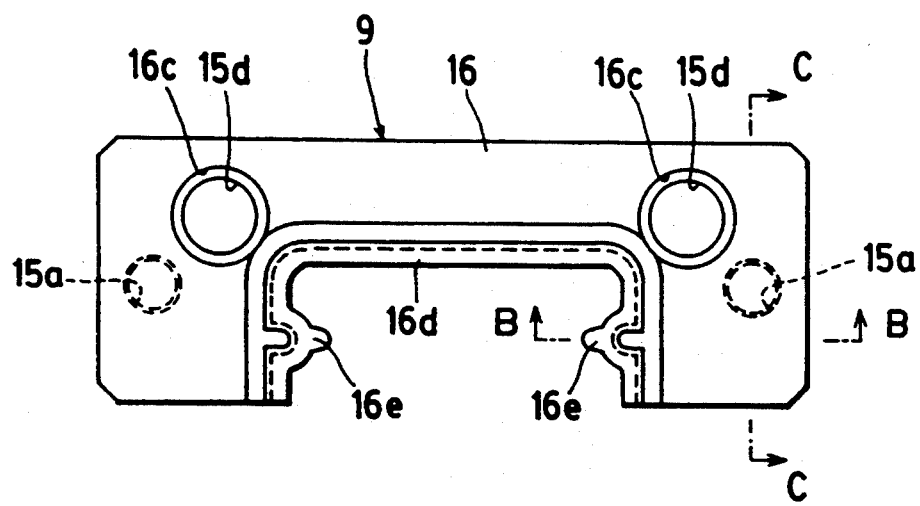
FIG. 12 is a front view of the seal equipped on the linear motion rolling guide unit shown in FIG. 3.
Figure 13:
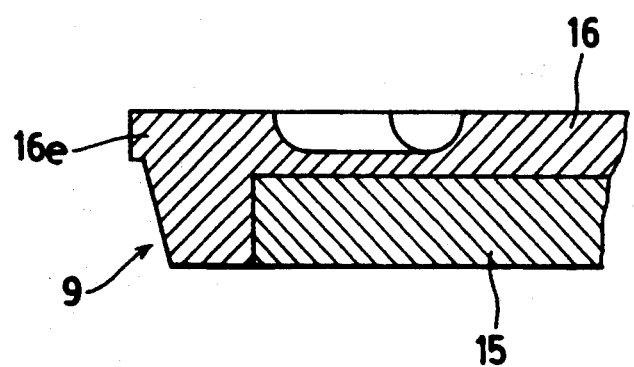
FIG. 13 is a cross-sectional view taken along line B—B relating to FIG. 10.
Figure 14:
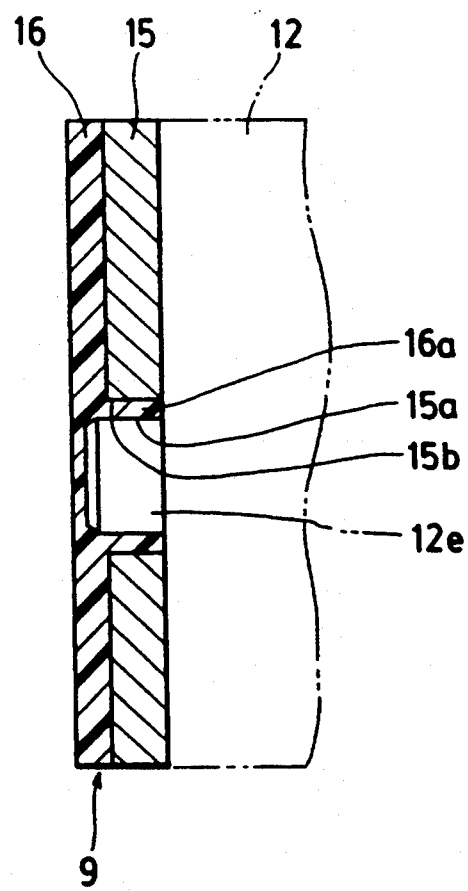
FIG. 14 is a cross-sectional view taken along line C—C relating to FIG. 12.

Furthermore, as shown in FIGS. 6, 12 and 13, openings 15d and 16c, into which the neck and head portions of screws 5 are respectively inserted, are formed in the above-mentioned core member 15 and elastic member 16. In addition, as shown in FIG. 13, tongue piece 16e, which makes sliding contact with track groove 1a formed in track rail 1, is formed on lip portion 16d of elastic member 16, namely the portion that makes sliding contact with track rail 1.

The following provides an explanation of a second embodiment of the linear motion rolling guide unit of the present invention. Furthermore, this linear motion rolling guide unit is of the round shaft type.

Figure 15:
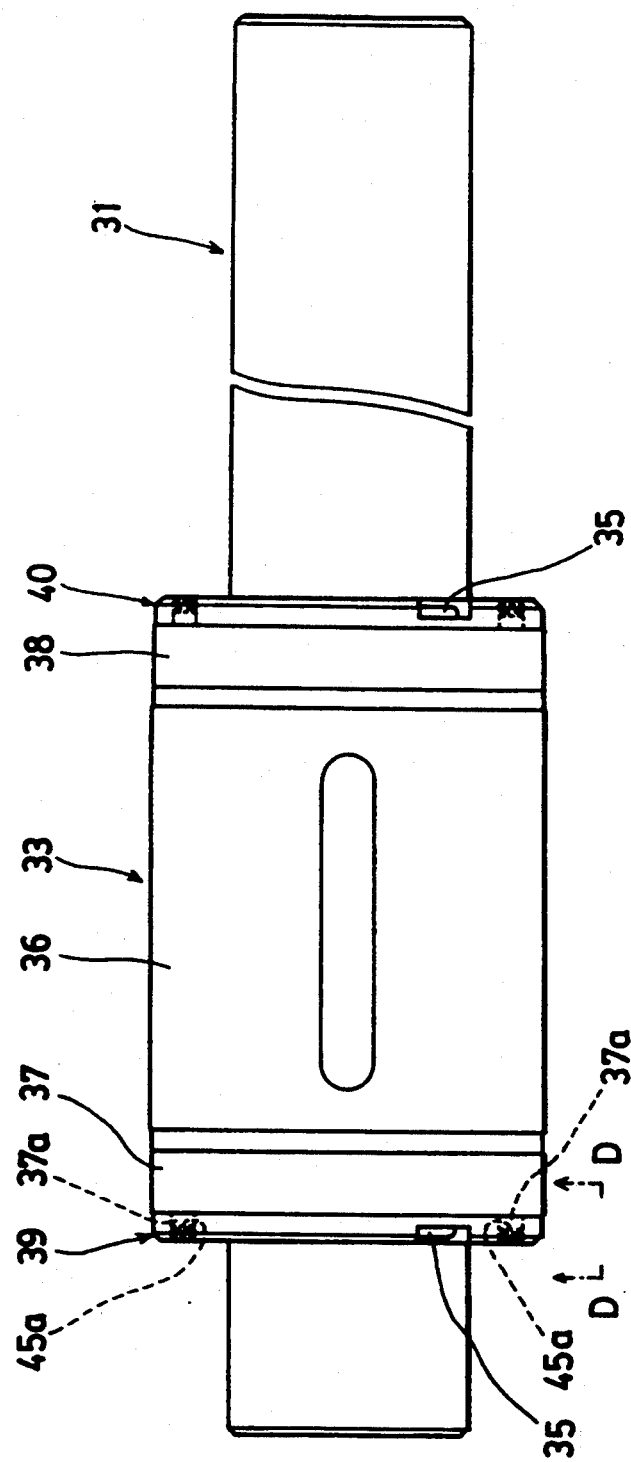
FIG. 15 is a top view of a second embodiment of the linear motion rolling guide unit of the present invention.
Figure 16:
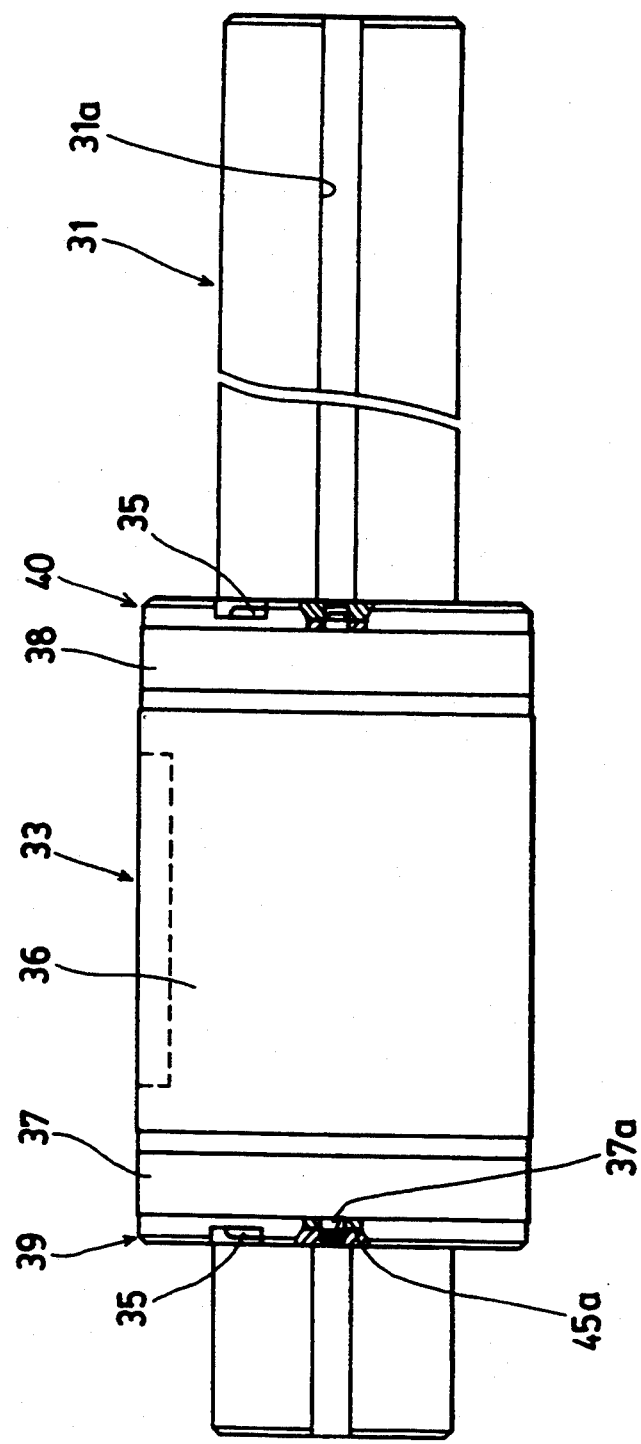
FIG. 16 is a side view, including a partial cross-section, of the linear motion rolling guide unit shown in FIG. 15.
Figure 17:
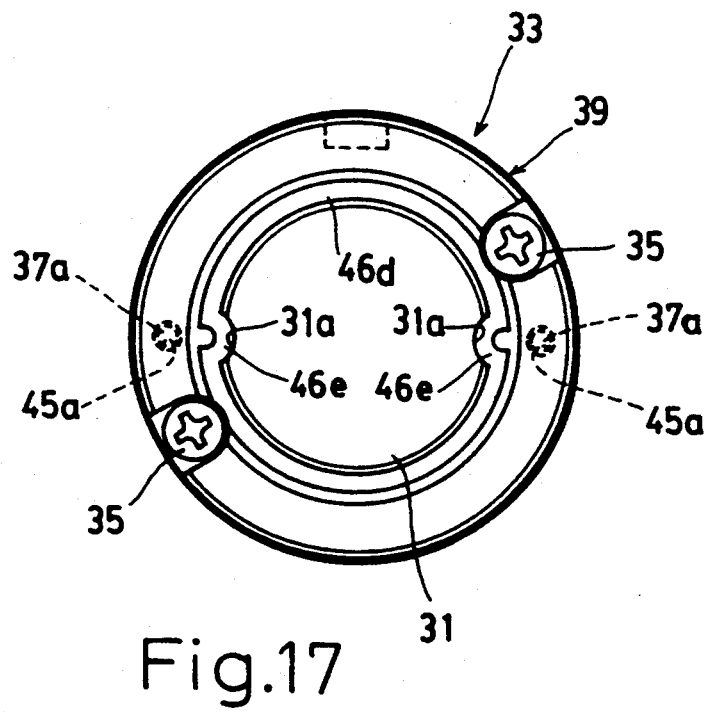
FIG. 17 is a front view of the linear motion rolling guide unit shown in FIGS. 15 and 16.

As shown in FIGS. 15 through 17, said linear motion rolling guide unit has track rail 31, roughly in the shape of a cylindrical column made of metal, in which one each of tracks in the form of two metal track grooves 31a are formed on the right and left sides in the lengthwise direction, a slider in the form of sliding unit 33 having a rolling element circulating path (not shown) and able to move relative to this track rail 31, and a plurality of rolling elements in the form of balls (not shown) arranged and contained in said rolling element circulating path, which bear the load between track rail 31 and sliding unit 33 by circulating while rolling over the above-mentioned track grooves 31a accompanying movement of said sliding unit 33.

As shown in FIGS. 15 and 16, sliding unit 33 is composed of casing 36 formed from metal or plastic which into roughly the shape of a cylinder overall, and a pair of end caps 37 and 38 made of metal or plastic which are fastened to both the front and back ends of said casing 36 with screws 35. Seals 39 and 40 are arranged on the outer surfaces of both these end caps 37 and 38, and fastened with end caps 37 and 38 by the above-mentioned screws 35.

The following provides a detailed description of the above-mentioned end caps 37 and 38 as well as both seals 39 and 40. Furthermore, since each of end caps 37 and 38 as well as each of seals 39 and 40 are mutually formed to have the same shape, explanations will be provided only for one end cap 37 and one seal 39.

Figure 18:
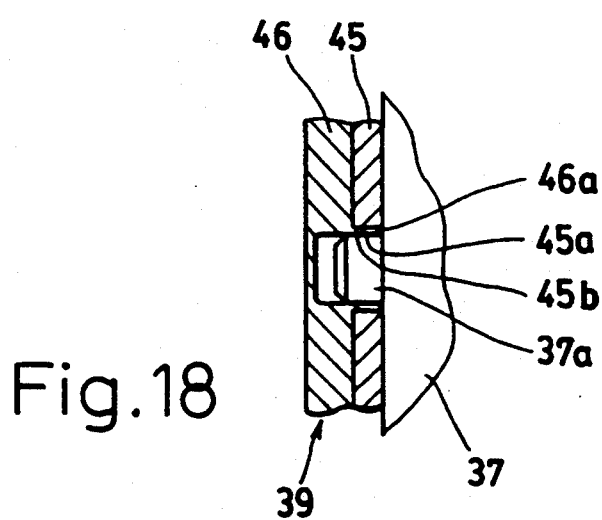
FIG. 18 is a view, including a partial-cross-section, from arrows D—D relating to FIG. 15.
Figure 19:
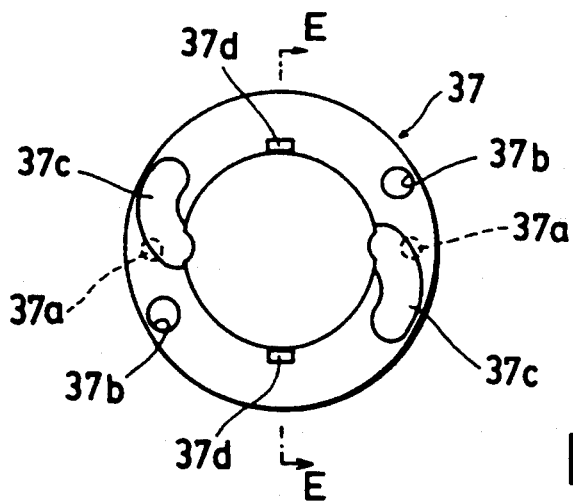
FIG. 19 is a rear view of the end cap equipped on the linear motion rolling guide unit shown in FIGS. 15 through 17.
Figure 20:
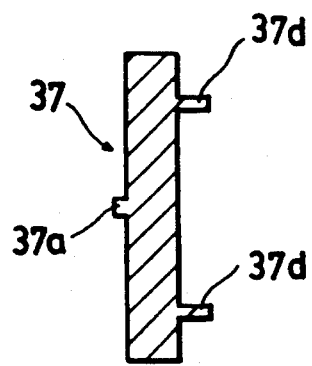
FIG. 20 is a cross-sectional view taken along line E—E relating to FIG. 19.

First with respect to end cap 37, as shown in FIGS. 18 through 20, cylindrical projections 37a, for example, are formed integrated into a single unit with end cap 37 and at symmetrical locations on the front surface of said end cap 37. These projections 37a are for stipulating the mounting position of seal 39.

Furthermore, as shown in FIG. 19, insertion holes 37b, in which screws 35 (shown in FIGS. 15 through 17) are inserted, are formed in end cap 37. In addition, as also shown in this drawing, roughly U-shaped groove 37c is formed at several locations (two locations in the drawing) on the back surface of end cap 37. This groove 37c forms a direction changing path which is a portion of the rolling element circulating path described above. In addition, as shown in FIG. 20, a pair of square cylindrical projections 37d are formed at symmetrical locations on the back side of end cap 37. The mounting position of end cap 37 on casing 36 is determined by the engaging of these projections 37d with fitting holes (not shown) formed in casing 36 corresponding to them.

The following provides an explanation of seal 39.

As shown in FIG. 18, seal 39 is composed of highly rigid plate-shaped core member 45 made of metal or plastic, and elastic member 46 made of rubber and so forth that is affixed to the surface of said core member 45 and makes sliding contact with track rail 31.

As is also shown in FIGS. 15 through 17 and FIG. 21, circular slot 45a is formed in the back side of core member 45. However, as is clear from FIG. 18, this slot 45a is such that opening 45b is formed in core member 45 to have a diameter slightly larger than the above-mentioned projection 37a formed in end cap 37, and thin film 46b formed integrated into a single unit with elastic member 46 is attached along the inner surface of this opening 45b. Projection 37a fits into this slot 45a. As a result of this constitution, the attachment of seal 39 (40) to sliding unit 33 composed of casing 36 as well as end caps 37 and 38 can be performed both highly accurately and easily. In addition, said seal is not shifted out of position even when subjected to impact force after attachment.

Figure 21:
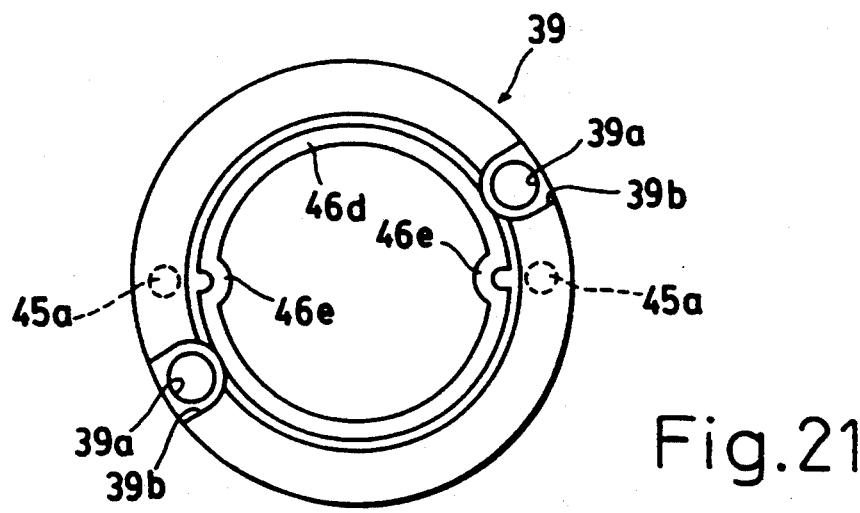
FIG. 21 is a front view of the seal equipped on the linear motion rolling guide unit shown in FIGS. 15 through 17.

Furthermore, as shown in FIG. 21, insertion holes 39a and countersunk portions 39b, into which the neck and head portions of screws 5 are respectively inserted, are formed in seal 39. In addition, as is also shown in FIG. 17, tongue piece 46e, which makes sliding contact with track groove 31a formed in track rail 31, is formed on lip portion 46d of elastic member 36 equipped on rail 39, namely the portion that makes sliding contact with track rail 31.

Furthermore, although projections 12e and 37a for determining the mounting positions of seals 9 and 39 are provided on end caps 7 and 37, and slots 15a and 45a that engage with said projections are formed on the seals in the above-mentioned first and second embodiments, naturally a constitution opposite to the above can be employed wherein projections are formed on the seals and slots are formed in the end caps.

In addition, although the shapes of the above-mentioned projections 12e and 37a as well as slots 15a and 45a are circular in each of the above-mentioned embodiments, these may also be of other shapes.

Furthermore, although linear motion rolling guide units are depicted in each of the above-mentioned embodiments that are of the type in which sliding units 3 and 33 have rolling element circulating paths, and rolling elements in the form of balls circulate within said rolling element circulating paths, the present invention is not limited to these constitutions, but rather the present invention can naturally be applied to various other types of linear motion rolling guide units.

In addition, although balls are used for the rolling elements in each of the above embodiments, the present invention may also be of a constitution in which rollers are used.

The following provides an explanation of a third embodiment of the linear motion rolling guide unit of the present invention with reference to the attached drawings.

Figure 22:
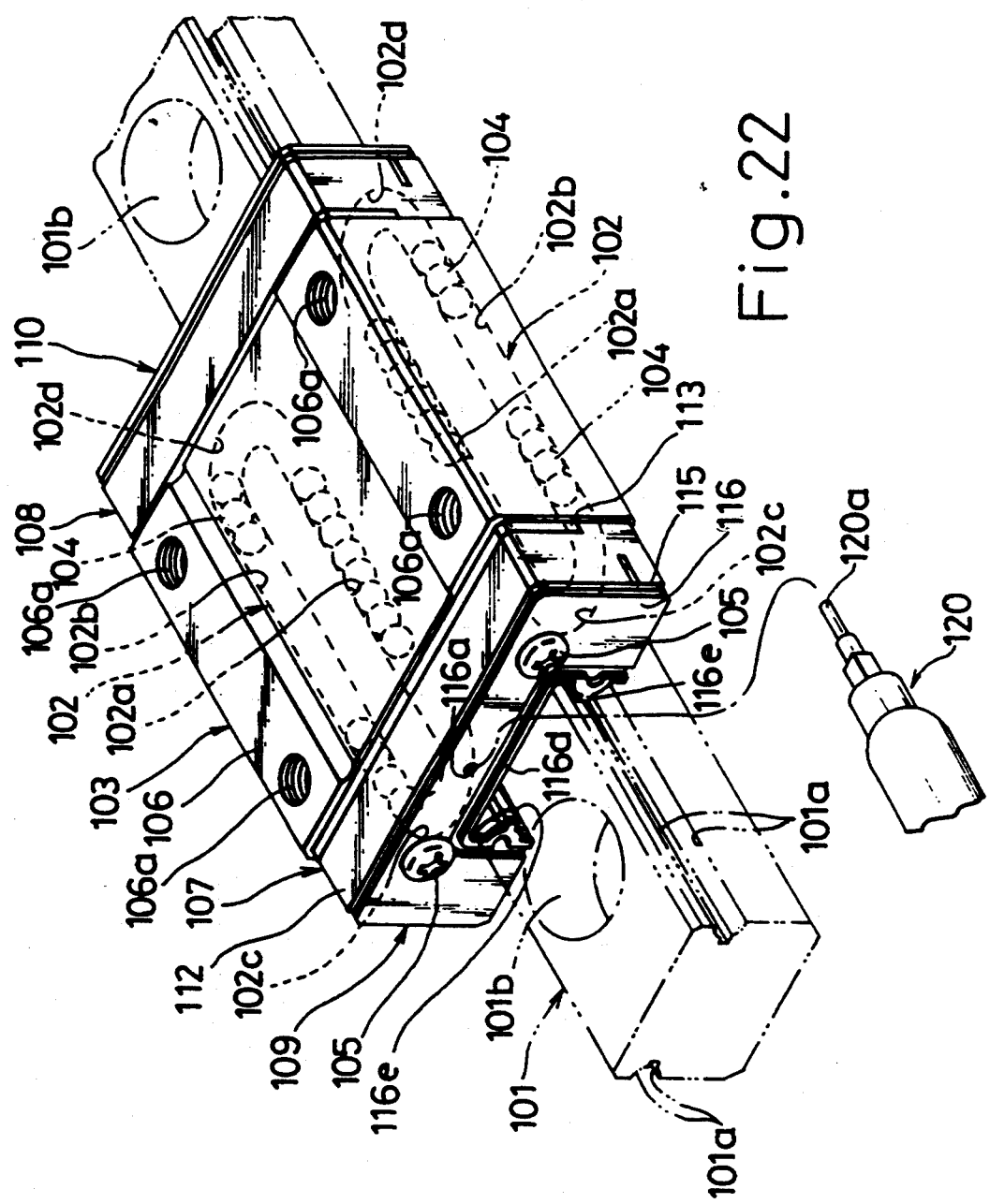
FIG. 22 is a perspective view of the essential portion of a third embodiment of the linear motion rolling guide unit of the present invention.
Figure 23:
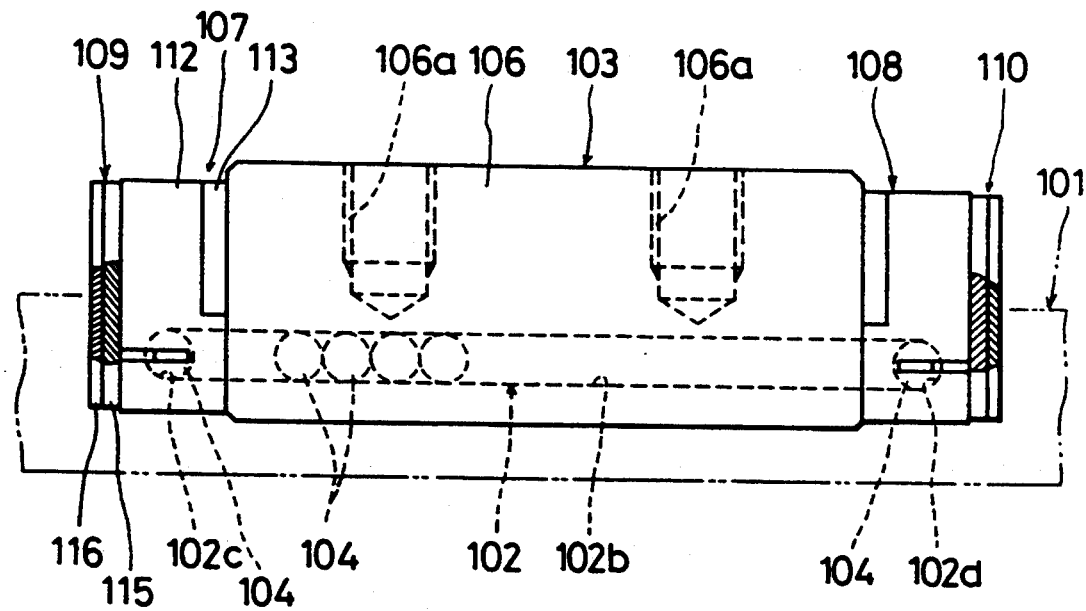
FIG. 23 is a side view, including a partial cross-section, of the constitution shown in FIG. 22.
Figure 24:
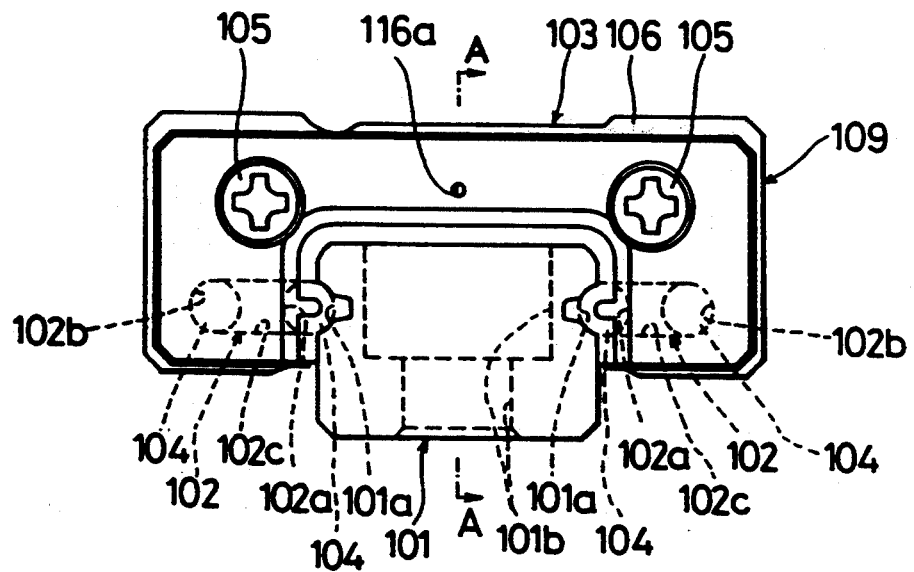
FIG. 24 is a front view of the constitution shown in FIG. 22.

As shown in FIGS. 22 through 24, said linear motion rolling guide unit has track rail 101, roughly in the shape of a square column made of metal, in which one each of tracks in the form of metal track grooves 101a are formed on the right and left sides in the lengthwise direction, a slider in the form of sliding unit 103 having rolling element circulating path 102 (to be later described in detail) and able to move relative to this track rail 101, and a plurality of rolling elements in the form of balls 104 arranged and contained in said rolling element circulating path 102, which bear the load between track rail 101 and sliding unit 103 by circulating while rolling over the above-mentioned track grooves 101a accompanying movement of this sliding unit 103.

Sliding unit 103 is composed of casing 106 formed from metal or plastic which is provided so as to straddle track rail 101, and a pair of end caps 107 and 108 made of metal or plastic which are fastened to both the front and back ends of said casing 106 with screws 105. Seals 109 and 110 are attached to each of the outer surfaces of said end caps 107 and 108. Furthermore, seals 109 and 110 are fastened to casing 106 together with end caps 107 and 108 by screws 105. As shown in FIGS. 22 through 24, the above-mentioned rolling element circulating path 102 is composed of a load bearing track in the form of load bearing track groove 102a and return path 102b formed linearly and mutually in parallel in casing 106, and a pair of roughly semi-circular direction changing paths 102c and 102d which are formed in both end caps 107 and 108 and connect said load bearing track groove 102a and return path 102b at both of their ends. Furthermore, said load bearing track groove 102a corresponds to track groove 101a of track rail 101.

However, said linear motion rolling guide unit is arranged on, for example, the bed of a machine tool (not shown), and track rail 101 is mounted on said bed with bolts. A table for holding a workpiece and so on (not shown) is bolted to sliding unit 103, with said table operating as the moving side. Namely, said table is reciprocated by a driving device with a workpiece placed on said table. Furthermore, as shown in FIG. 22, a plurality of insertion holes 101b, into which bolts are inserted for mounting to the above-mentioned bed and so on, are provided in a row along the lengthwise direction of track rail 101. In addition, as shown in FIGS. 22 and 23, a plurality of threaded holes 106a are formed in the upper surface of casing 106 of sliding unit 103. The above-mentioned table is fastened to sliding unit 103 by bolts (not shown) that are screwed into these threaded holes 106a.

The following provides a detailed description of the constitutions of the above-mentioned end caps 107 and 108 as well as both seals 109 and 110. Furthermore, since each of end caps 107 and 108 as well as each of seals 109 and 110 are mutually formed to have the same shape, explanations will be provided only for one end cap 107 and one seal 109, while explanations of the other end cap 108 and other seal 110 will be omitted.

An explanation is first provided regarding end cap 107.

Figure 25:
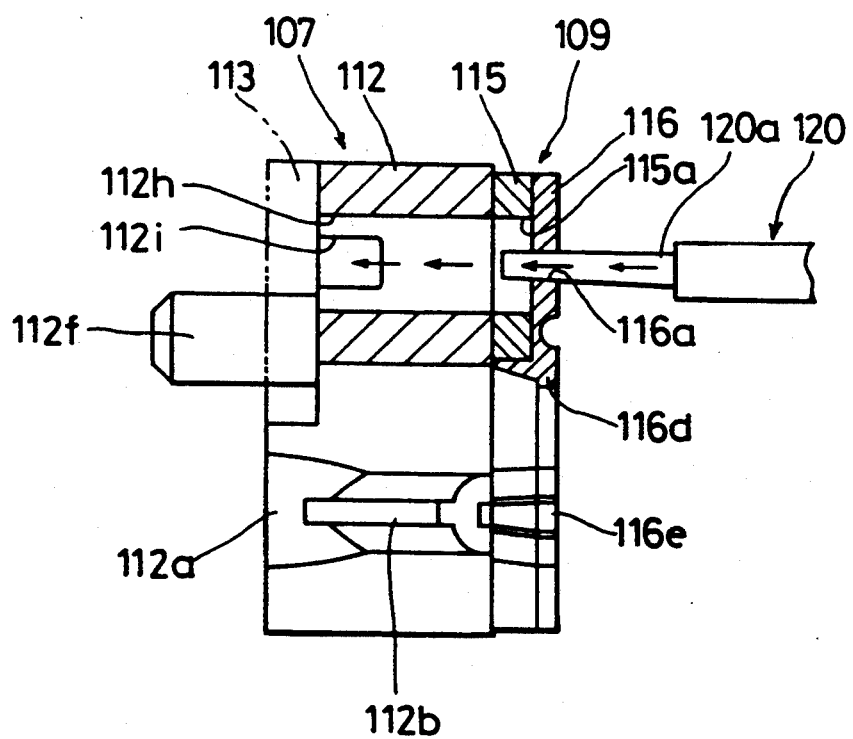
FIG. 25 is a view showing a portion of the cross-section taken along line A—A relating to FIG. 24.

As is clear from FIGS. 22, 23 and 25, this end cap 107 is composed of main portion 112 and circulating path spacer 113 juxtapositioned between said main portion 112 and casing 106.

Figure 26:
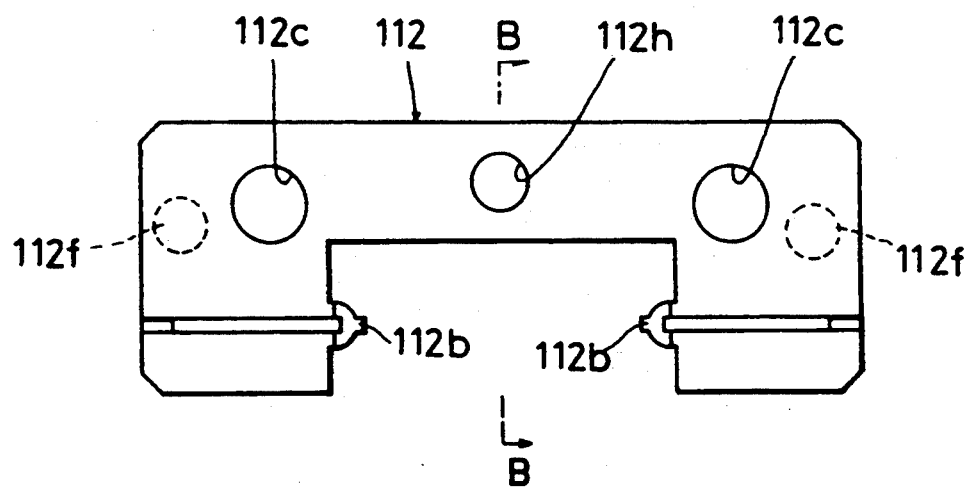
FIG. 26 is a front view of the main portion of the end cap equipped on the linear motion rolling guide unit shown in FIG. 22.
Figure 27:
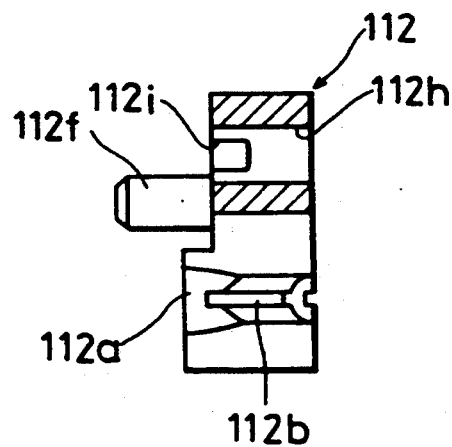
FIG. 27 is a cross-sectional view taken along line B—B relating to FIG. 26.
Figure 28:
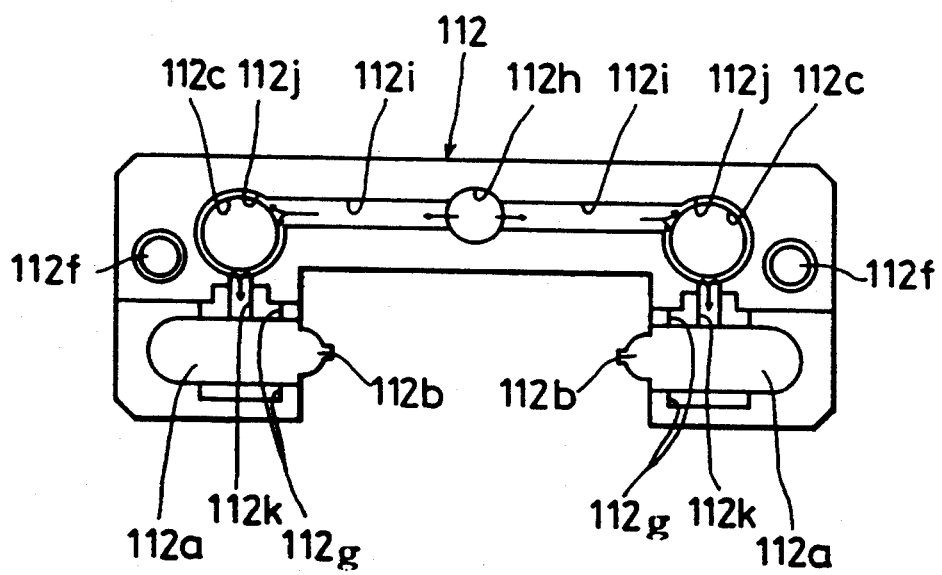
FIG. 28 is a rear view of the main portion of the end cap shown in FIG. 26.
Figure 29:
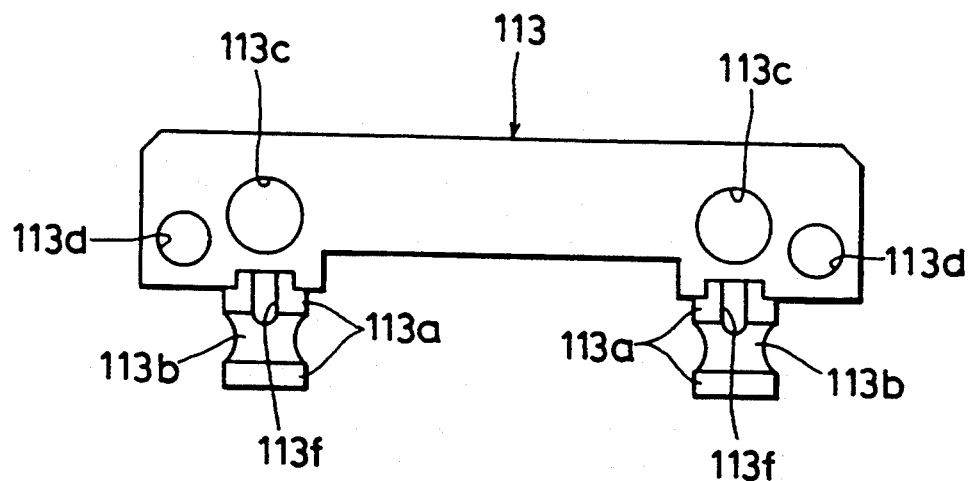
FIG. 29 is a front view of the circulating path spacer which is a constituent member of the end cap equipped on the linear motion rolling guide unit shown in FIG. 22.
Figure 30:
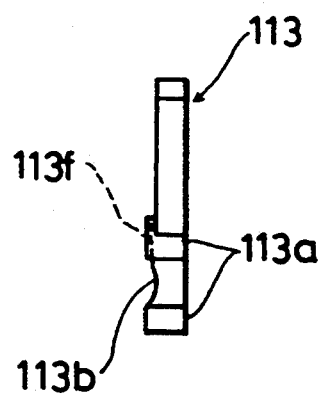
FIG. 30 is a side view of the circulating path spacer shown in FIG. 29.

The details of said main portion 112 are shown in FIGS. 26 through 28, while the details of said circulating path spacer 113 are shown in FIGS. 29 and 30.

As shown in FIGS. 25, 27 and 28, roughly U-shaped groove 112a, which forms the outer half of direction changing path 102c (refer to FIGS. 22 through 24), a portion of rolling element circulating path 102 described above, is formed in this main portion 112. On the other hand, as shown in FIGS. 29 and 30, roughly semi-cylindrical projections 113a are provided at two locations on circulating path spacer 113, while grooves 113b are formed in said projections 113a forming the inner half of the above-mentioned direction changing path 102c.

Namely, said projections 113a fit into slots 112g (shown in FIG. 28) formed in the above-mentioned main portion 112. This means that direction changing path 102c is formed by aligning both said grooves 112a and 113b. In addition, as shown in FIGS. 25 through 28, ball retaining band 112b is formed in main portion 112 for retaining balls 104 that have rolled along load bearing track groove 102a (refer to FIGS. 22 and 24) to lead said balls 104 into the above-mentioned direction changing path 102c and 102d.

Furthermore, as shown in FIG. 26, insertion holes 112c, in which screws 105 (shown in FIGS. 22 and 24) are inserted, are formed in the right and left sides of main portion 112. Said screws 105 are screwed into threaded holes (not shown) formed in the ends of casing 106 through these insertion holes 112c.

In addition, a pair of cylindrical projections 112f are formed integrated into a single unit with main portion 112 on the back side of said main portion 112. The mounting position of end cap 107 on casing 106 is determined by these projections 112f fitting into fitting holes (not shown) formed in casing 106.

In addition, as shown in FIG. 29, insertion holes 113c and 113d, into which the above-mentioned screws 105 and projections 112f of main portion 112 are inserted, are formed in circulating path spacer 113.

The following provides a detailed description of seal 109.

As shown in FIGS. 22, 23, 25, 31 and 32, seal 109 is composed of highly rigid plate-shaped core member 115 made of metal or plastic, and elastic member 116 made of rubber and so forth that is affixed with adhesive and so forth to the surface of said core member 115 and makes sliding contact with track rail 101.

As shown in FIGS. 22, 24, 25, 31 and 32, lubricant injection holes 115a and 116a are concentrically formed in the centers of core member 115 and elastic member 116 that compose seal 109. As shown in FIGS. 22 and 25, after making available a syringe-like lubricant injector 120, nozzle 120a of said lubricant injector 120 is inserted into these lubricant injection holes 115a and 116a to inject lubricant in the form, for example, grease.

Grease that is injected through the above-mentioned lubricant injections holes 115a and 116a reaches rolling element circulating path 102 and balls 104 via the route described below.

Namely, as shown in FIGS. 25 through 28, through hole 112h, that connects with the above-mentioned lubricant injection holes 115a and 116a, is formed in main portion 112 of seal 109. Two branching grooves 112i, extending to the left and right and having one end connected with through hole 112h, are formed in the inside of main portion 112.

On the other hand, as shown in FIG. 28, ring-shaped grooves 112j connected with said through hole 112h are formed around each insertion hole 112c formed in main portion 112 for insertion of screws 105 (refer to FIG. 22). The above-mentioned branching grooves 112i are connected to these ring-shaped grooves 112j at their other ends. Small straight grooves 112k that mutually connect said ring-shaped grooves 112j and U-shaped grooves 112a positioned below, are provided as also shown in FIG. 28. Furthermore, as shown in FIGS. 29 and 30, grooves 113f corresponding to these grooves 112k are formed in circulating path spacer 113 coupled to the above-mentioned main portion 112. A path having a roughly circular cross-section is thus formed by aligning these grooves 112k and 113f.

In the above-mentioned constitution, as indicated with arrows in FIGS. 25 and 28, grease injected by lubricant injector 120 through lubricant injection holes 115a and 116a reaches U-shaped grooves 112a after passing through through hole 112h, branching grooves 112i, ring-shaped grooves 112j and grooves 112k and 113f (refer to FIG. 29, etc.) in that order. As described above, since grooves 112a form direction changing path 102c, which is a portion of rolling element circulating path 102 (refer to FIGS. 22 through 24), grease is supplied to said rolling element circulating path 102 as well as each of balls 104 that roll along said rolling element circulating path 102.

As described above, although ring-shaped grooves 112j (refer to FIG. 28), connected to insertion holes 112c into which screws 105 are inserted are formed and used as pathways for supplying grease in the present embodiment, according to said constitution, since the thread troughs of said screws 105 also act as pathways for grease, grease is supplied with high efficiency.

In addition, as is clear from, for example, FIG. 25, since lubricant injection hole 116a formed in elastic member 116 has an extremely small diameter, narrow nozzle 120a of lubricant injector 120 fits tightly in said lubricant injection hole 116a. Consequently, outflow of grease is prevented after removing said nozzle 120a from said lubricant injection hole 116a.

Figure 31:
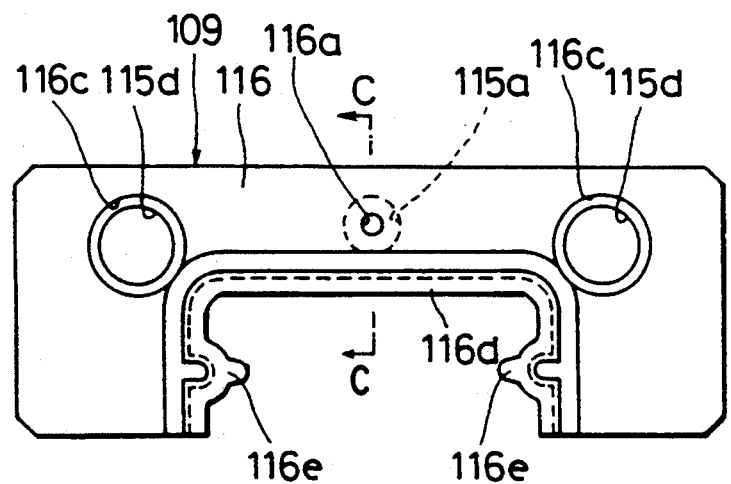
FIG. 31 is a front view of the seal equipped on the linear motion rolling guide unit shown in FIG. 22.
Figure 32:
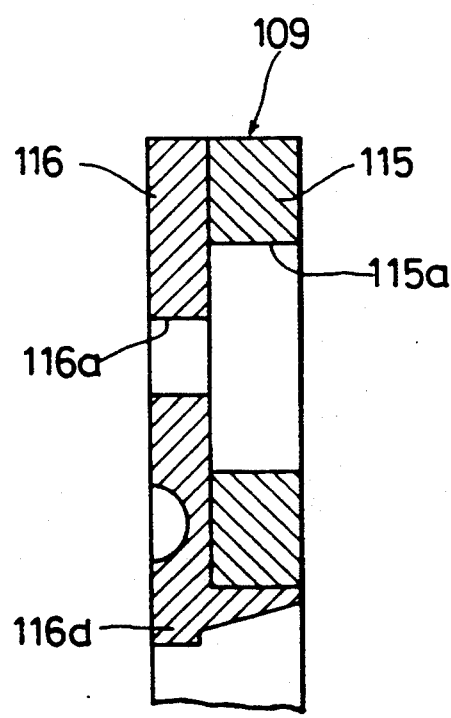
FIG. 32 is a cross-sectional view taken along line C—C relating to FIG. 31.

Furthermore, as shown in FIG. 31, openings 115d and 116c, into which the neck and head portions of screws 105 are inserted, are formed in the above-mentioned core member 115 and elastic member 116. In addition, as shown in FIGS. 22 and 25, tongue piece 116e, which makes sliding contact with track groove 101a formed in track rail 101, is formed on lip portion 116d of elastic member 116, namely the portion that makes sliding contact with track rail 101.

Figure 33:
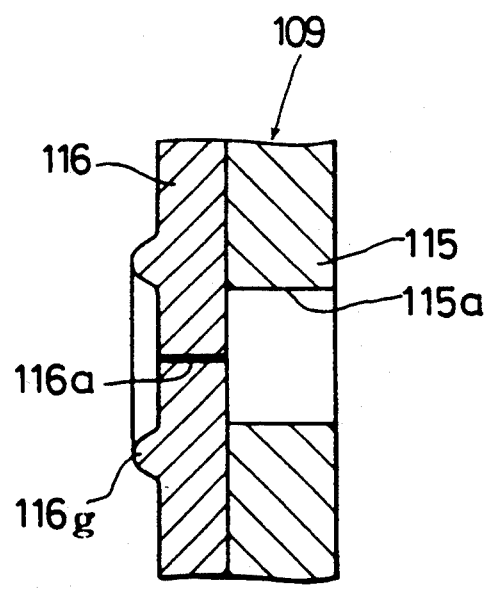
FIG. 33 is a vertical cross-sectional view of the essential portion of a fourth embodiment of the linear motion rolling guide unit of the present invention.

FIG. 33 shows the essential portion of a fourth embodiment of the linear motion rolling guide unit of the present invention. Furthermore, since said linear motion rolling guide unit is composed in the same manner as the third embodiment of the linear motion rolling guide unit of the present invention shown in FIGS. 22 through 32 with the exception of those portions shown in FIG. 33, an explanation of the entire unit will be omitted, with the explanation instead focusing only on the essential portion. In addition, the same reference numerals will be used for those constituent members that are identical to the constituent members of the third embodiment of the linear motion rolling guide unit of the present invention.

As shown in FIG. 33, in this linear motion rolling guide unit, lubricant injection hole 116a formed in elastic member 116 that composes seal 109 together with core member 115 is in the form of an occludable narrow hole. Namely, although this lubricant injection hole 116a expands due to the elasticity of elastic member 116 when nozzle 120a of lubricant injector 120 shown in FIGS. 22 and 25 is inserted, simultaneous to nozzle 120a being removed, said lubricant injection hole 116a returns to its original diameter and is occluded. Accordingly, outflow of injected grease is nearly completely prevented.

However, since there is concern that visually recognizing lubricant injection hole 116a in the occluded state may be difficult in work locations in which lighting and so forth is relatively dark, the following constitution is employed.

Namely, as shown in FIG. 33, ring-shaped or roughly ring-shaped protrusion 116g is formed integrated into a single structure with elastic member 116 on the surface of said elastic member 116 so as to surround said lubricant injection hole 116a in the form of a mark. Consequently, a worker is able to easily confirm lubricant injection hole 116a thus allowing injection of grease to be performed rapidly.

Furthermore, this mark is not limited to the form described above, but other forms may also be employed, and said mark may also be colored. However, if made in the form of ring-shaped protrusion 116g as described above, said protrusion 116g effectively acts as a guide when inserting nozzle 120a of lubricant injector 120 into lubricant injection hole 116a.

Furthermore, although linear motion rolling guide units are depicted in the above-mentioned third and fourth embodiments that are of the type in which sliding unit 103 has a rolling element circulating path, and rolling elements in the form of balls 104 circulate within said rolling element circulating path, the present invention is not limited to these constitutions, but rather the present invention can naturally be applied to various other types of linear motion rolling guide units.

In addition, although balls 104 are used for the rolling elements in the above-mentioned third and fourth embodiments, the present invention may also be of a constitution in which rollers are used. The present invention may also use oil and so forth as a lubricant, instead of grease.

As has been explained above, since projections and slots are provided on a slider and seals and these determine the mounting positions of the seals by engaging with each other, in addition to attachment of the seals being able to be performed both highly accurately and easily, the present invention also offers a first advantage of those seals not shifting out of position even when subjected to impact after attachment.

In addition, since lubricant injection holes are formed in the seals, the linear motion guide unit of the present invention offers the second advantage of lubricant being able to be supplied both quickly and easily without having to disassemble and so forth even in the case of small linear motion guide units.

What is claimed is:

1. A linear motion guide unit equipped with a track rail in which tracks are formed in the lengthwise direction, a slider able to move relative to said track rail, and seals provided on both ends of said slider; wherein, projections that determine the mounting position of said seals are formed on either said slider or said seals, and slots that engage with said projections are formed in either said slider or said seals on which said projections are not formed.

2. The linear motion guide unit as set forth in claim 1 wherein said seals are composed of a highly rigid plate-shaped core member and an elastic member that is affixed to said core member and makes sliding contact with said track rail.

3. The linear motion guide unit as set forth in claim 2 wherein said slots are formed in said core member and said projections are formed on said slider.

4. The linear motion guide unit as set forth in claim 1 wherein said slider has a casing wherein a load bearing track corresponding to said track and a return path roughly parallel to it are formed, and end caps coupled to both ends of said casing wherein direction changing paths that form a rolling element circulating path with said load bearing track and return path are formed, and is equipped with a plurality of rolling elements arranged and contained in said rolling element circulating path that bear the load by circulating while rolling over said track.

5. A linear motion guide unit equipped with a track rail in which tracks are formed in the lengthwise direction, a slider able to move relative to said track rail, and seals provided on both ends of said slider; wherein, lubricant injection holes are formed in said seals.

6. The linear motion guide unit as set forth in claim 5 wherein said seals are composed of a highly rigid plate-shaped core member and an elastic member that is affixed to said core member and makes sliding contact with said track rail, and said lubricant injection holes are formed in said core member and elastic member.

7. The linear motion guide unit as set forth in claim 6 wherein said lubricant injection hole formed in said elastic member is an occludable narrow hole.

8. The linear motion guide unit as set forth in claim 7 wherein a mark is affixed near said lubricant injection hole in said elastic member.

9. The linear motion guide unit as set forth in claim 8 wherein said mark is a roughly ring-shaped protrusion provided so as to surround said lubricant injection hole.

10. The linear motion guide unit as set forth in claim 5 wherein said slider has a casing wherein a load bearing track corresponding to said track and a return path roughly parallel to it are formed, and end caps coupled to both ends of said casing wherein direction changing paths that form a rolling element circulating path with said load bearing track and return path are formed, and is equipped with a plurality of rolling elements arranged and contained in said rolling element circulating path that bear the load by circulating while rolling over said track.

* * * * *